UNITED STATES PATENT OFFICE.

ALBERT B. MOSES, OF SEATTLE, WASHINGTON.

PROCESS OF PRODUCING LIQUID FOOD FROM SOY-BEANS.

1,281,411. Specification of Letters Patent. Patented Oct. 15, 1918.

No Drawing. Application filed December 27, 1917. Serial No. 209,193.

*To all whom it may concern:*

Be it known that I, ALBERT B. MOSES, a citizen of the United States, residing at Seattle, in the county of King and State of Washington, have invented a certain new and useful Improvement in Processes of Producing Liquid Food from Soy-Beans, of which the following is a specification.

My invention relates to a process of producing a liquid food which shall contain nutritious portions of the constituent elements of soy beans, which process may be described as follows:

The beans are preferably pulverized or disintegrated by suitable mechanical means to reduce them to a powder or to a granular form, in which form they are then mixed with a sufficient quantity of water to form a fluid mass which fluid mass is allowed to stand for a length of time (preferably about six hours) sufficient to permit the water to dissolve and absorb the greater portion of the soluble nutritious contents thereof after which the fluid mass is gradually heated to a temperature only sufficient to pasteurize or sterilize it and to expel the odor and unpleasant taste of some constituent parts of the soy beans.

The fluid mass being cooled, its water, now charged with its dissolved nutritious content, is strained into a separate vessel leaving a pulpy mass of water soaked powder which pulpy mass is then subjected to the pressure of a mechanical press thereby to extract therefrom a thicker mixture consisting of the remaining water and the proteids, fat, and sugar that were constituent parts of the soy beans, and thereupon said thicker mixture is mixed with the strained water in said separate vessel there to form a liquid food product that closely resembles cow's milk in appearance and which has substantially the same nutritious properties.

The respective amounts of proteids, fat and sugar that may be extracted by pressure from said pulpy mass may be largely controlled by the degree of pressure to which said pulpy mass is subjected.

Manifestly, such liquid food product is sanitary since it is a vegetable extract made without being subjected to a contact with one's hand.

What I claim is:

1. The process of making a liquid food, which shall contain nutritious portions of the constituent elements of soy beans, which process consists: In disintegrating soy beans, then mixing them with a sufficient quantity of water to form a fluid mass, which fluid mass is allowed to stand until said water dissolves and absorbs soluble nutritious contents thereof, then, said fluid mass is gradually heated to a temperature sufficient to expel the odor of some constituent parts thereof, then, the liquid mass being cooled, its liquid, now charged with its dissolved nutritious contents, is strained; then, the residue is subjected to mechanical pressure and the resultant liquid is added to the aforesaid strained liquid to form a sanitary liquid food.

2. The process of making a liquid food, which shall contain nutritious portions of the constituent elements of soy beans, which process consists: In pulverizing soy beans to reduce them to the form of a powder; mixing said powder with a sufficient quantity of water to form a fluid mass, which fluid mass is allowed to stand until said water dissolves and absorbs soluble nutritious contents of said powder; then, said fluid mass is gradually heated to a temperature sufficient to expel the odor of some constituent parts of the beans; then, the fluid mass being cooled, its liquid, now charged with its dissolved nutritious contents, is strained into a separate vessel thus leaving a pulpy mass of liquid soaked powder; then, subjecting said pulpy mass to a pressure in a mechanical press thereby to extract from said pulpy mass a thicker mixture consisting of the remaining water and the proteids, fat and sugar that were constituent parts of said beans; and, then, pouring said thicker mixture into said vessel there to mix with said strained water to form a mixture that constitutes a sanitary liquid food.

In witness whereof, I hereunto subscribe my name this 20th day of December, A. D. 1917.

ALBERT B. MOSES.

Witnesses:
W. A. ROBERTS,
A. HASKINS.